(12) United States Patent
Hirsh (10) Patent No.: US 9,235,878 B1
(45) Date of Patent: Jan. 12, 2016

(54) METHOD FOR RETAINING EDGES IN AN ENLARGED DIGITAL IMAGE

(71) Applicant: Allen Gene Hirsh, Silver Spring, MD (US)

(72) Inventor: Allen Gene Hirsh, Silver Spring, MD (US)

( * ) Notice: Subject to any disclaimer, the term of this patent is extended or adjusted under 35 U.S.C. 154(b) by 0 days.

(21) Appl. No.: 14/505,693

(22) Filed: Oct. 3, 2014

Related U.S. Application Data (60) Provisional application No. 61/886,453, filed on Oct. 3, 2013, provisional application No. 61/905,555, filed on Nov. 18, 2013.

(51) Int. Cl.
*G06T 5/00* (2006.01)

(52) U.S. Cl.
CPC ..................... *G06T 5/003* (2013.01)

(58) Field of Classification Search
None
See application file for complete search history.

(56) References Cited

U.S. PATENT DOCUMENTS

| | | | | |
|---|---|---|---|---|
| 7,773,826 B2 * | 8/2010 | Watanabe | ............ | H04N 1/6027 345/20 |
| 8,953,058 B2 * | 2/2015 | Ben-Eliezer | ............ | H04N 9/045 348/222.1 |
| 2003/0185464 A1 * | 10/2003 | Maenaka | ............... | G06T 3/4007 382/300 |

* cited by examiner

*Primary Examiner* — Bernard Krasnic (57) ABSTRACT

The invention described here provides a novel method of preventing the loss of focus and range of colors when digital image files are expanded to a larger size. Unlike interpolation algorithms and algorithms using Fourier analysis to create new pixels, the present system uses a combination of pseudo-randomizing functions and user controlled edge detection to enhance edges initially softened by expansion using interpolation algorithms. The resulting images can be optimized to provide a superior approximation to what would be an accurate photographic representation at the larger image size. Furthermore, the flexibility in edge detection sensitivity allows the operator to strongly mitigate the structural artifacts produced by lossy compression algorithms such as the jpeg system and sampling errors widespread in very small images. As a result files as small as 200 kilobytes can be effectively expanded to 250 or even 500 megabytes in many cases.

6 Claims, 6 Drawing Sheets
(6 of 6 Drawing Sheet(s) Filed in Color)

METHOD FOR RETAINING EDGES IN AN ENLARGED DIGITAL IMAGE

CROSS-REFERENCES TO RELATED APPLICATIONS

The present application is a U.S. Non-Provisional Application which claims the benefit of U.S. Provisional application No. 61/886,453 (filed Oct. 3, 2013) and U.S. Provisional application No. 61/905,555 (filed Nov. 18, 2013), all of which are herein incorporated by reference in their entirety.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

BACKGROUND OF INVENTION (1) Field of the Invention

The invention described here provides a novel method of preventing the loss of focus and range of colors when digital image files are expanded to a larger size using existing methods of pixel interpolation. It also provides methods of selectively masking structural artifacts introduced by standard digital compression algorithms such as jpeg which defeat the most advanced Fourier transform based methods for expanding images to a larger size.

(2) Description of Prior Art

The challenge posed by the need to expand digital images without loss of image fidelity has prompted the development of several disparate systems for generating new pixels derived from information stored in the original pixels of an unexpanded image. The most widely used algorithms are polynomial interpolation equations that attempt to define values of new pixels by approximating the equations defining a surface in each color of the pixels as a function of position in the image. These algorithms use bilinear or bicubic equations to define a surface of best fit to the values of the original pixels. They suffer from the inevitable decay of edge focus and color intensity as they create an increasing population of pixels with color values intermediate to the original pixels during repeated rounds of image expansion. In contrast, the most successful and sophisticated methods could be characterized as pseudovectorizations. They use Fourier transforms to characterize the variations in color in the neighborhood of each pixel and then use those patterns to generate the intermediate pixels during image scale-up (U.S. Pat. No. 7,218,789; The contourlet transform: an efficient directional multiresolution image representation IEEE Transactions on Image Processing Volume: 14, Issue: 12 pp 2091-2106). These methods works considerably better than the aforementioned polynomial interpolations because 1) they are much more sensitive to complex structural variation in the data; and 2) Because random noise in images tends to be high frequency data with a low autocorrelation coefficient, and Fourier transforms are the most efficient way known to suppress such noise. Thus, the most successful previous attempts at solving these problems have focused on using Fourier transform techniques to characterize functions closely approximating the color variations among pixels adjacent to and at identified edges, then using those functions to properly color the new, initially blank pixels in an expanded image file. These methods have achieved significant advances over systems that average color difference between pixels using interpolation algorithms such as simple spline approximations or the bicubic algorithm, but they suffer from a different basic limitation. In small digital image files complex shapes are crudely sampled, leading to sharply defined anomalies known as sampling artifacts; or, alternatively, lossy compression systems, such as the widely used jpeg algorithms, will create structures, compression artifacts, such as strong edged square tiling that are difficult to logically distinguish from the true edges of the original image. Algorithms that are optimized to retain the color differences among pixels rather than averaging the differences, such as the Fourier transform based algorithms, will frequently maintain and strengthen these artifacts, thereby severely limiting the degree to which the images can be expanded before the artifacts make them esthetically and commercially unacceptable.

BRIEF DESCRIPTION OF THE SEVERAL VIEWS OF THE DRAWING

The patent or application file contains at least one drawing executed in color. Copies of this patent or patent application publication with color drawing(s) will be provided by the Office upon request and payment of the necessary fee.

BRIEF SUMMARY OF THE INVENTION

The present invention is directed to rediscovering and strengthening edges in digital image files that are first expanded using interpolation. Each value of each color channel of each pixel in such an expanded file is compared to the values in the same color channel of the nearest neighbor pixels and if the mean difference of a function of the set of differences between these values is within a predetermined range then the values in each color channel of the pixel being analyzed will be modified according to a predetermined algorithm (dithering algorithm) to either increase the differences, or, more rarely, decrease them. By choosing an appropriate dithering algorithm and a series of ranges of edge strength to be operated on independently, one can selectively suppress geometrically symmetric visual artifacts such that even badly compressed files can be successfully re-expanded. The invention also allows for the successful expansion of small regions of large image files that contain limited high fidelity information but have been deemed too small to resize until now because the total number of pixels is critically limited.

DETAILED DESCRIPTION OF THE INVENTION

In contrast to the prior art, the present invention is directed to rediscovering and strengthening edges in files that are first expanded using interpolation; in a preferred embodiment this is either the bicubic interpolation algorithm or the bilinear interpolation algorithm or a combination of these. In a preferred embodiment the present invention then examines each pixel in a digital image first expanded by interpolation, comparing each of its three color values to each of the corresponding values in its eight nearest neighboring pixels and calculates the values of a function of the differences between the analyzed pixel and each of its neighbors in that color. If the value falls within a predetermined range of values the pixel is deemed to be part of an edge in that color. If the pixel is part of an edge, then each of its color values is compared to the weighted average value of the corresponding color over all nine pixels comprising the pixel and its eight nearest neighbor pixels and if the value of the color in the pixel being analyzed is less than or equal to the weighted average of the nine pixels the pixel being analyzed is deemed to be on the dark side of the edge in that color, otherwise it is deemed to be on the bright side of the edge. The next step calculates a randomizing value, which can be positive, negative or zero for each color and which is added to the original color value of the pixel being analyzed. These new values are then multiplied by predetermined factors independently for each color and dependent on whether the pixel is identified as dark edge pixel in that color or a bright edge pixel in that color. In the next step gamma is restored. In a preferred embodiment this is done by using the altered color value for the brightest color in the original pixel as a determinant of the dominant color in the new pixel and adjusting the other color values so they are in the same ratio to each other in the new color values as they were in the unaltered original pixel. This final pixel then replaces the original in a copy of the image being analyzed. The result is a simultaneous dithering and strengthening of edges that addresses all of the problems mentioned above with notable success even when images are expanded to 30 times their height and 30 times their width or more.

In an aspect of the present invention geometrically defined sections of an image, defined as a pixels lying between a predetermined minimum x value and a predetermined maximum x value distinct for each y value, are to be modified according to a first set of algorithms, and pixels in regions of the image outside of the designated region are modified according to a second set of algorithms distinct from the set used to modify those pixels within the defined section of the image; and pixels to be modified by a first set of algorithms are defined by color ratios. Specifically the pixel will to be analyzed by the first set of algorithms will have a ratio of its red channel value to its blue channel value that falls between a first pair of values which are a first predetermined minimum value and a first predetermined maximum value, and will have a ratio of its red channel value to its green channel value that falls between a first pair of values which are a second predetermined minimum value and a second predetermined maximum value, and will have a ratio of its green channel value to its blue channel value falls between a first pair of values which are a third predetermined minimum value and a third predetermined maximum value; and pixels to be modified by a first set of algorithms are defined by color channel intensity values. Specifically the pixel to be analyzed by the first set of algorithms will have a red channel value that falls between a first pair of values which are a predetermined minimum value and a predetermined maximum value, and a green channel value that falls between a second pair of values which are a predetermined minimum value and a predetermined maximum value, and a blue channel value that falls between a third pair of values which are a predetermined minimum value and a predetermined maximum value, and pixels having color channel intensity values outside of the designated ranges of color intensities are modified according to a second set of algorithms distinct from the set used to modify those pixels within the defined color channel intensity values ranges of the image.

Figure 1:
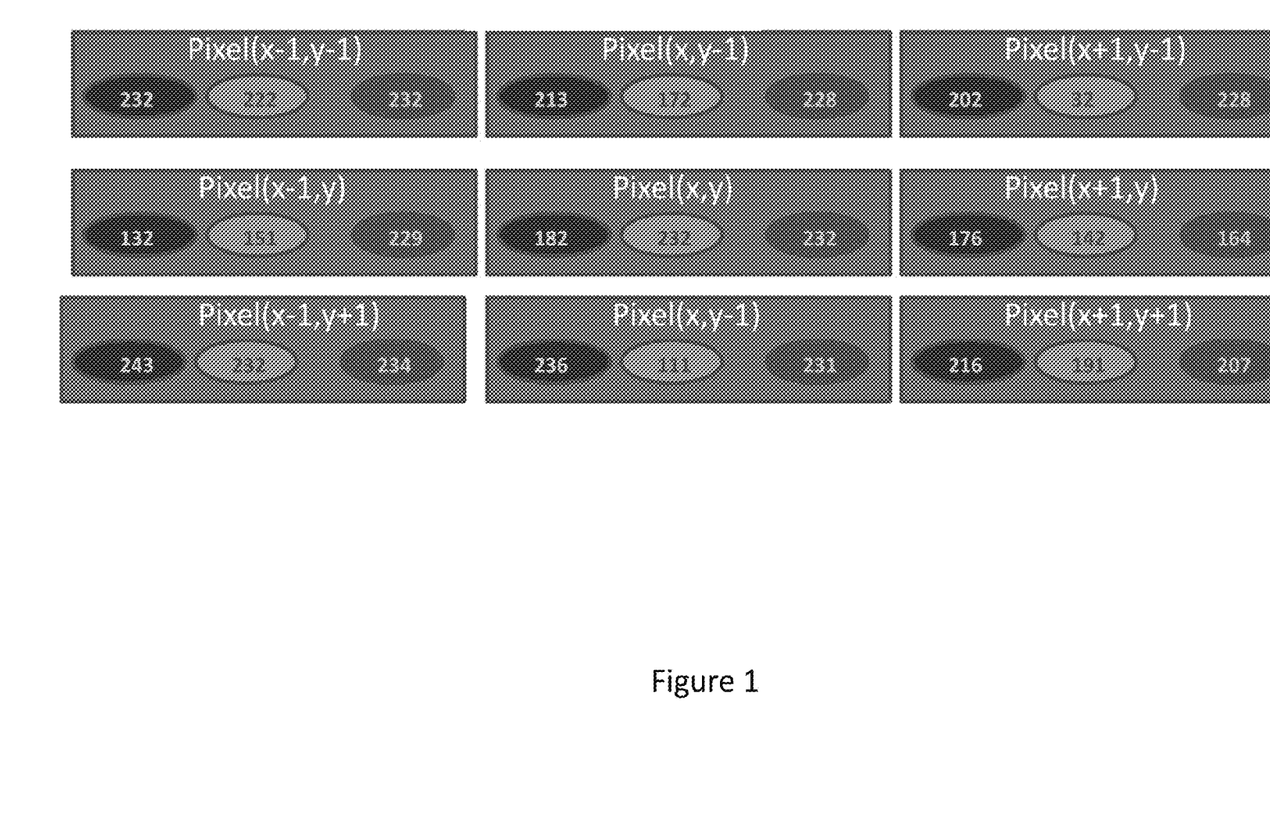
FIG. 1 shows the arrangement of pixels around a pixel being analyzed as possibly an edge pixel and modified if it is part of an edge. The pixel being analyzed is denoted pixel(x,y) and the surrounding pixels used in the edge detection analysis and edge modification algorithms are denoted pixel(x+i,y+j), i,j=−1 to 1. The numbers inside the colored ellipses represent the intensity of the color in the RGB system.

An aspect of the present invention can be characterized by the following set of logical steps:

Numbers in the colored ellipses in FIG. 1 represent luminance strength, i.e. color values, 0 to 255 in the RGB system, denominated here as colorvalue, of the addresses in the bit map for each of the colors of each pixel. In the RGB system the color type is either red or green or blue and the set of values of the colors of each type are here referred to as color channels.

Step 1: Determination of whether pixel(x, y) is to be analyzed as an edge pixel by:

1. Determining whether the pixel's x, y position in the image falls between predetermined minimum and maximum x and predetermined minimum and maximum y values.

2. Then determining whether the red colorvalues, green colorvalues and blue colorvalues each fall between separate predetermined values for each of the three color channels. A color value is denoted as pixel(x+i,y+j)colorvalue, i,j=−1 to 1. Thus pixel(x+i,y+j)blue is the number value in the lowest byte in memory of pixel(x+i,y+j), pixel(x+i,y+j)green is the number value in the next byte and pixel(x+i,y+j)red the number stored in the highest memory address representing pixel (x+i,y+j).

3. Then determining whether each of the three ratios: (red colorvalue/green colorvalue), (red colorvalue/blue colorvalue) and (green colorvalue/blue colorvalue) each fall between distinct minimum and maximum values for each of the three ratios.

Step 2: Determination of whether pixel(x, y) is an edge pixel by calculating the color (luminosity) for each color channel between the pixel(x, y) and the 8 surrounding pixels in a source bitmap.

$$\text{Color(luminosity)} = \Sigma([\text{pixel}(x,y)\text{colorvalue}] - [\text{pixel}(x+i,y+j)\text{colorvalue}])^2$$

i,j=−1 to 1, color=blue or green or red

Pixel(x,y) is classified as an edge pixel iff at least one of the three Color(luminosity) values falls between a predetermined minimum luminosity value and a maximum luminosity.

Step 3: Determination of whether pixel(x,y) identified in step 1 as an edge pixel is on the dark side of an edge or the bright side of an edge.

Calculate the average value (Color(average)) of each color channel for the 8 surrounding pixels:

$$\text{Color(average)} = (\Sigma \text{pixel}(x+i, y+j) \text{colorvalue})/9$$

i,j=−1 to 1, i,j not simultaneously 0

Color(average)=average of blue or green or red values of the designated pixels. For example, in FIG. 1 Green(average)=(222+172+32+151+232+142+111+191)/8

If pixel(x,y)colorvalue≥Color(average) then the pixel is classified as in the bright side of an edge pixel, otherwise it is classified as in the dark side of an edge.

Then a modified Color(average) is calculated:

$$\text{Color(average)} = ((2\text{pixel}(x+i,y+j)\text{colorvalue}) + \text{weight}*\text{pixel}(x,y)\text{colorvalue})/(9+\text{weight}),$$

i,j=4 to 1, i and j not simultaneously 0. Where weight is a predetermined constant that controls the dominance of the colors of pixel(x,y).

Step 4: Calculation of the edge randomization factors. The value of each color channel in each pixel surrounding pixel (x,y), as shown in FIG. 1, plus the value of the congruent channel in pixel(x,y) serve as input variables to a randomization function F(pixel(x+i,y+j)colorvalue, pixel(x,y)colorvalue). F can be any combination of trigonometric, exponential, logarithmic, polynomial or power functions. A preferred example would be:

$$F(\text{pixel}(x+i,y+j)\text{colorvalue}, \text{pixel}(x,y)\text{colorvalue}) = \cos[([\text{pixel}(x,y)\text{color value}] - [\text{pixel}(x+i,y+j)\text{colorvalue}])^2],$$

i,j=−1 to 1

Then a separate randomization value, R(color), for each color channel is calculated as:

$$R(\text{color}) = 2F(\text{pixel}(x+i,y+j)\text{colorvalue}, \text{pixel}(x,y)\text{colorvalue}),$$

i,j=−1 to 1

Step 5: Randomization of colorvalues for Pixel(x,y).

For each pixel(x,y)colorvalue a potential new value, pixel(x,y)color value_new, is calculated as:

$$\text{pixel}(x,y)\text{color value\_new} = \text{Min}(\text{Color(average)} + EM*R(\text{color}), \text{maxcolor})$$

where EM is a predetermined multiplier determining the strength of the randomization. A value of zero means that pixel(x,y)color value_new equals the weighted average of the respective color of the 9 pixels. Large numbers produce large shifts in shade and hue but make more subtle edges visible. Typical values are in the range 0 to 6. Maxcolor is the maximum value that can be assigned to colorvalue, 255 for all three colors in the RGB system.

Step 6: Brightness adjustment of edge pixels. If Pixel(x,y) is defined as on the dark side of an edge in a color then a second new colorvalue is calculated as:

$$\text{pixel}(x,y)\text{color value\_new2} = \text{pixel}(x,y)\text{color value\_new} * \text{dark\_edge\_colorvalue\_multiplier}$$

Where there are three predetermined dark_edge_colorvalue_multiplier values, one for each of the three color channels: red, green and blue. Typical values in a preferred analysis are in the range 0.8 to 0.99.

If Pixel(x,y) is defined as on the bright side of an edge in a color then a second new colorvalue is calculated as:

$$\text{pixel}(x,y)\text{color value\_new2} = \text{pixel}(x,y)\text{color value\_new} * \text{light\_edge\_colorvalue\_multiplier}$$

Where there are three predetermined light_edge_colorvalue_multiplier values, one for each of the three color channels: red, green and blue. Typical values in a preferred analysis are in the range 1.01 to 1.2.

Step 7 Preservation of Gamma.

Gamma is the term denoting the color relationships between the colorvalues of a pixel.

Preserving gamma is a method of maintaining color fidelity. In this analysis it is characterized by two ratios, R1 and R2:

$$R1 = (\text{second highest value of the pixel}(x,y)\text{color values})/(1 + \text{maximum of the pixel}(x,y)\text{color values})$$

and $$R2 = (\text{smallest value of the pixel}(x,y)\text{color values})/(1 + \text{maximum value of the pixel}(x,y)\text{color values}).$$

These ratios are used to calculate a final new value for the pixel at position x,y according to:

$$\text{New second highest value of the pixel}(x,y)\text{color value\_new2} = R1*(\text{maximum pixel}(x,y)\text{color value\_new2})$$

$$\text{New smallest value of the pixel}(x,y)\text{color value\_new2} = R2*(\text{maximum pixel}(x,y)\text{color value\_new2})$$

The maximum pixel(x,y)color value_new2, new second highest value of the pixel(x,y)color value_new2 and new smallest value of the pixel(x,y)color value_new2 are written to the appropriate addresses of Pixel(x,y) in a target bitmap that is initially an exact copy of the source bitmap. The process is then repeated for the next pixel in the source bitmap.

Figure 2:
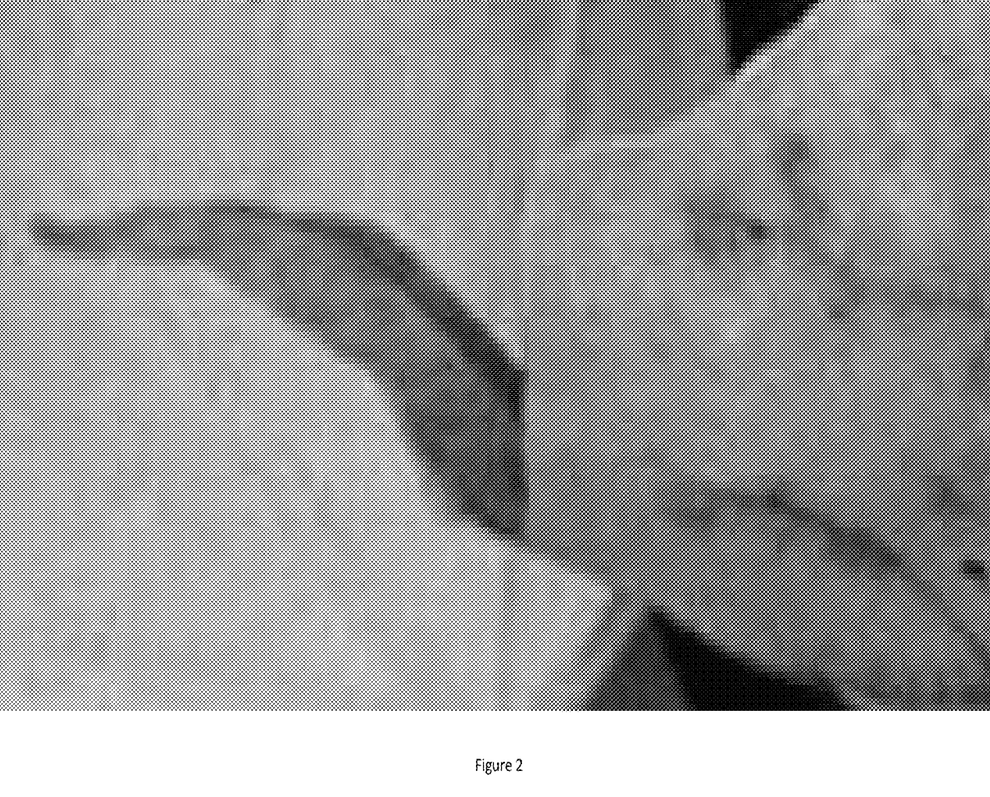
FIG. 2 shows a pixel duplicated image, expanded 32 times in both the x and y dimensions (32×), of a small piece of a fallen autumn leaf. The original image was saved as a significantly compressed jpeg with numerous tiling artifacts. The pixel duplication algorithm faithfully reproduces the image structure of the original. The original image is 212 pixels wide and 117 pixels high.
Figure 3:
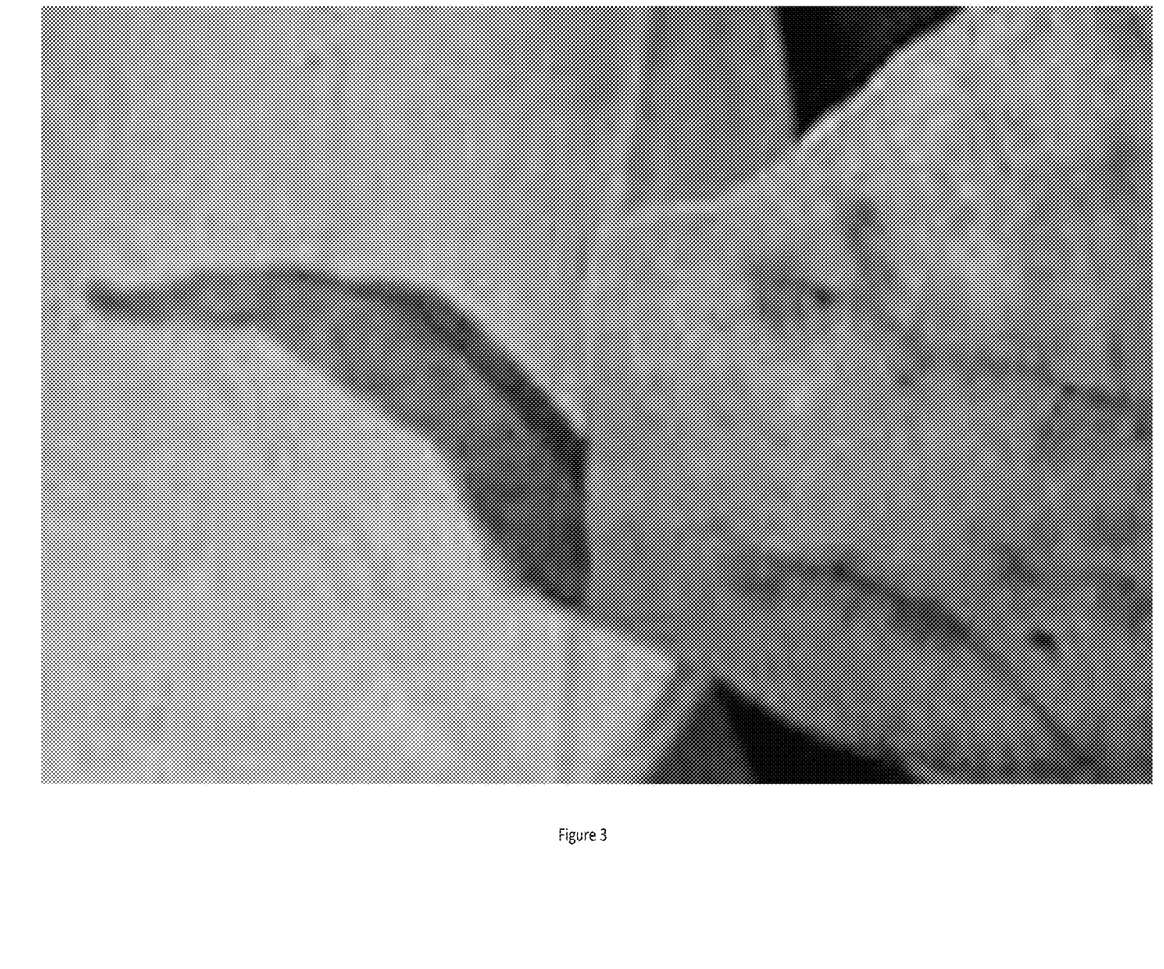
FIG. 3 shows the image expansion of the original image 32 times in both width and height using the bicubic algorithm in Adobe's Photoshop™. The degradation of the fine textured parts of the original image is notable as a decrease in focus compared to FIG. 2. The tiling remains prominent.
Figure 4:
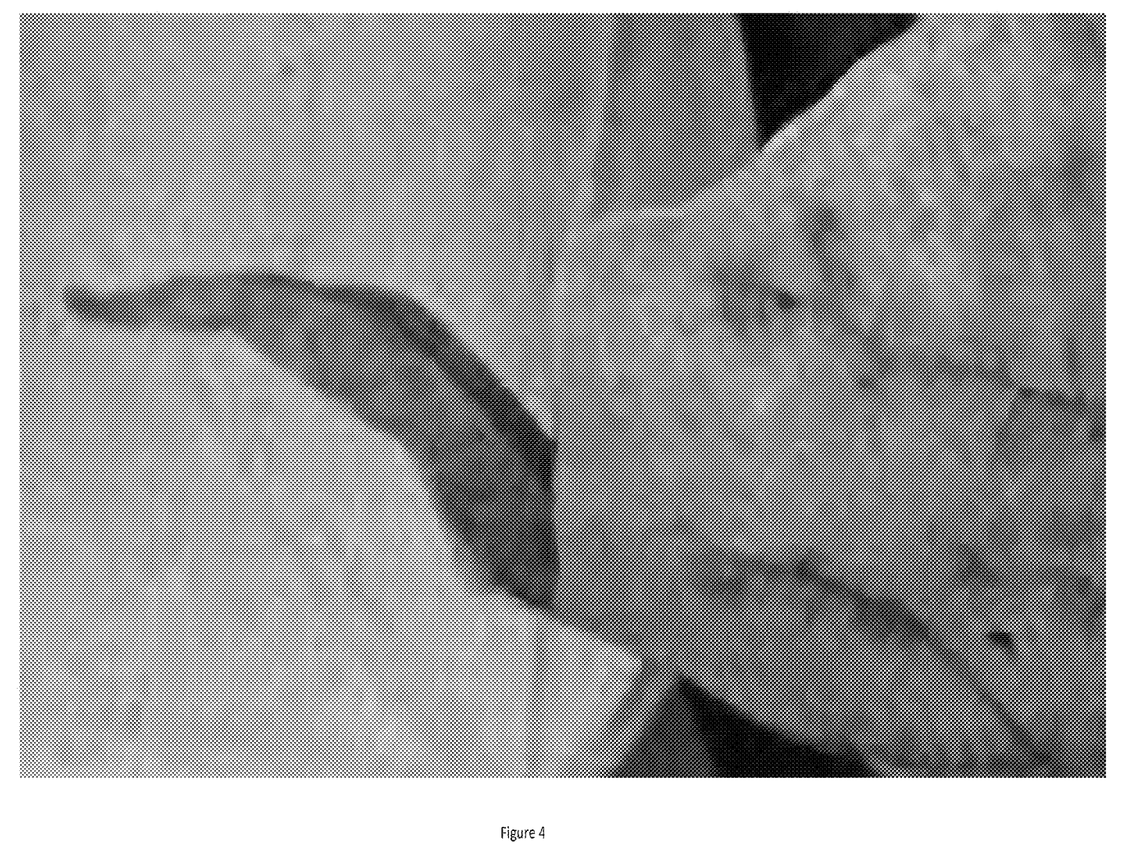
FIG. 4 shows the image using the same 32× expansion in both the width and height of the original image using onOne Software's Perfect Resize 7.5 Pro Premium™ with the jpeg optimizer switch on. The degradation of the fine textured parts of the original image is once again notable as a decrease in focus compared to FIG. 2. The tiling remains prominent. In fact, there is very little difference between FIG. 3 and FIG. 4.
Figure 5:
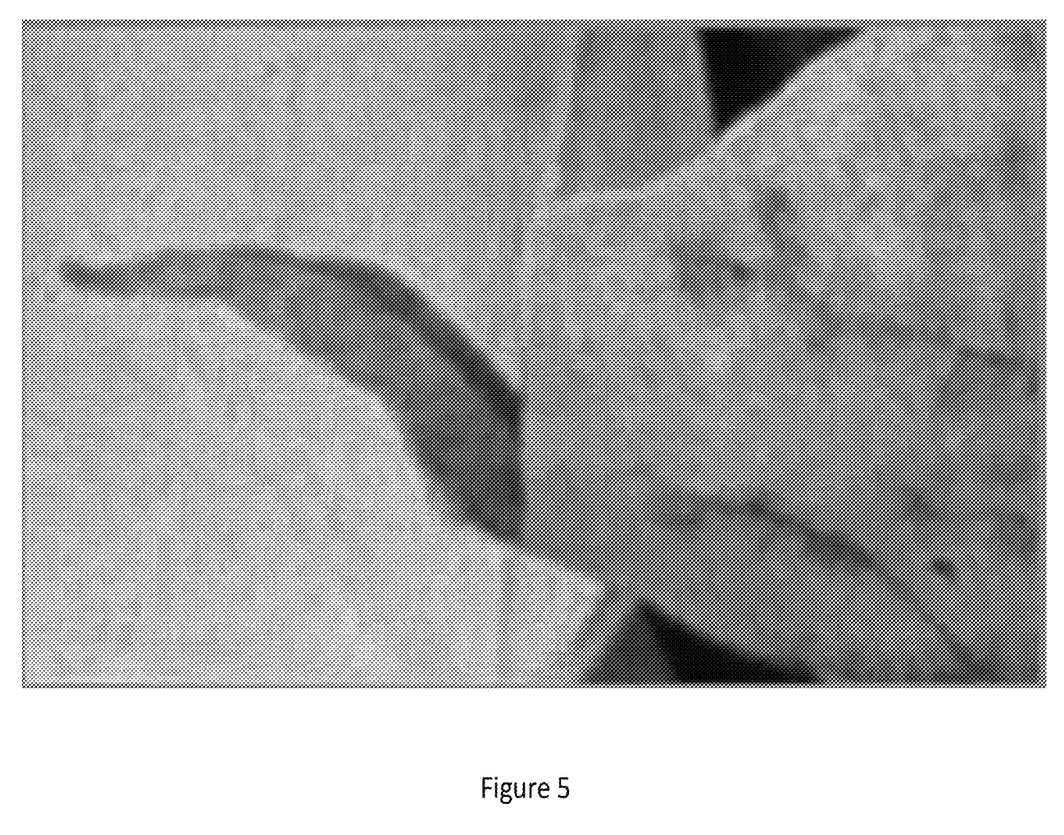
FIG. 5 shows the image using the same 32× expansion in both the width and height of the original image using the present invention with initial edge modification values set to suppress the tiling artifacts. Since the present invention can simultaneously retain textural detail, the result is a much better representation of the original image compressed so as to avoid the formation of the tiling artifacts as shown in the following FIG. 6.
Figure 6:
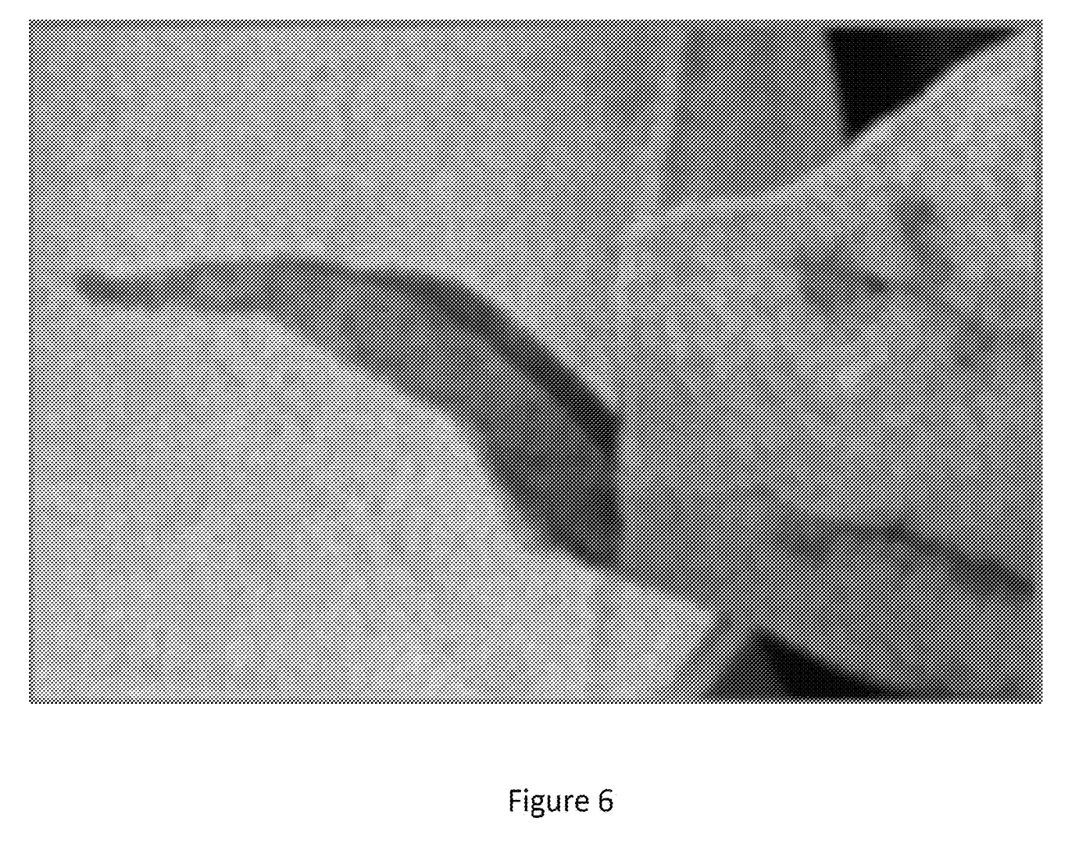
FIG. 6 shows the image using the same 32× expansion in both the width and height of the high resolution compression version of the original image, expanded using the present invention.

If the dark-edge-colorvalues are ≥1 and the light-edge-colorvalues are ≤1 then the present invention can powerfully suppress structural noise, e.g. the tiling artifacts created by the popular jpeg compression algorithms. This is illustrated by comparison of FIG. 2 to FIG. 5. FIG. 2 shows a pixel duplicated image, expanded 32 times in both the x and y dimensions (32×), of a small piece of a fallen autumn leaf. Pixel duplication preserves the visual structure of the original image. The original image displays significant tiling artifacts from the application of jpeg compression. FIG. 5 shows the result of applying a cycle of bilinear interpolation expansion followed by edge recapture with dark-edge-colorvalues set ≥1 and the light-edge-colorvalues set ≤1, followed by two more cycles of bilinear interpolation expansion each followed by more typical edge recapture with dark-edge-colorvalues set ≤1 and the light-edge-colorvalues set ≥1, until the image is 32×. The suppression of structural noise is extremely effective. This is especially evident when FIG. 5 is compared to FIG. 6. FIG. 6 is an image expansion to 32× by the present invention of the original image that was initially compressed with a high quality jpeg setting that avoided tile creation and provided a reasonably accurate representation of actual leaf structure. Thus the accuracy of recovered textural details is verified in this latter comparison. In contrast, FIG. 3 displays the 32× expansion of the tiled image by bicubic expansion in Adobe's Photoshop™ software and FIG. 4 shows the same 32× expansion in onOne Software's Perfect Resize 7.5 Pro Premium™ with the jpeg optimizer switch on. Not only is the tiling still prominent in both images, but they are almost identical, implying that the Fourier analysis has actually been suppressed in Perfect Resize 7.5 Pro Premium™ in favor of a backup bicubic algorithm.

What is claimed is:

1. A method for identifying and sharpening edges in a digital image comprising:

loading into a memory linked to a computer processor unit (CPU) a first block of numbers defining pixels of a digital image in which each pixel is defined by k independent color value channels, wherein k≥3, and a horizontal position of the pixel is calculated to be between a lowest value and a maximum value in each line of pixels in the image and a vertical position of the pixel is defined by a line number with a value which is greater than or equal to that of a lowest line of pixels in the image, and less than or equal to a maximum line number of the lines in the image;

loading into the memory linked to the CPU a second block of numbers that is an identical copy of the first block of numbers defining the pixels of the digital image;

for each channel of each pixel storing a difference between a color value of that channel and a color value of the same channel in each of the nearest $n^2-1$ pixels, wherein n is a fixed integer and n≥_3, then raising an absolute value of each of the differences to an exponentiation power m, wherein m≥0, then summing the exponentiated values to get a sum of channel specific differences between the pixel and the nearest $n^2-1$ pixels;

comparing each sum of channel specific differences to a first predetermined chosen value for identifying an edge, wherein the first predetermined chosen value is greater than or equal to 0, and is less than or equal to a maximum possible value of the sum of such channel specific differences, and a second predetermined chosen value for identifying the edge, wherein the second predetermined chosen value is greater than or equal to 0, and is less than the first predetermined chosen value;

if the sum of the channel specific differences is greater than or equal to the second predetermined chosen value and is less than or equal to the first predetermined chosen value, then that pixel is deemed to be on an identified edge pixel;

calculating a sum of the color values of each channel of each of the nearest $n^2-1$ pixels of each edge pixel plus the color value of each channel of the edge pixel times a weighting factor $w_{channel}$ specific to that channel, wherein $w_{channel}$ is >0, and dividing by $n^2-1+w_{channel}$ to obtain a mean channel value for the nearest $n^2-1$ pixels of each edge pixel plus the edge pixel;

for each channel of each of the nearest $n^2-1$ pixels of each edge pixel, use the color value of that channel or a difference between that color value and the color value of that channel of the edge pixel as an independent variable in a mathematical function to yield a second value;

all of the second values for each channel of each of the nearest $n^2-1$ pixels of the edge pixel are summed to produce a third value;

the third value for each channel is added to the original color value of that channel in the edge pixel to produce a modified color value of the color value of that channel;

comparing the mean channel value of each channel to the original color value of that channel in the edge pixel;

if the mean channel value is less than or equal to the original color value of that channel in the edge pixel, multiplying the modified color value of the color value of that channel in the edge pixel by a predetermined bright edge value to create a second modified color value of that channel in the edge pixel;

if the mean channel value is greater than the original color value of that channel in the edge pixel, multiplying the modified color value of the color value of that channel in the edge pixel by a predetermined dark edge value to create a second modified color value of that channel in the edge pixel;

calculating a maximum color value of the original channel color values in the edge pixel;

for each original color value of a channel in the edge pixel that is less than the maximum color value of the original channel color values in the edge pixel, calculate a third modified color value by the formula A*(B/C), wherein A is equal to the second modified color value of the maximum color value of the original channel color values in the edge pixel, B is equal to the color value of the original channel color values in the edge pixel, and C is equal to the maximum color value of the original channel color values in the edge pixel;

pointing to the second block of numbers in the memory that is a same number of bytes from the beginning of the second block of numbers as the first channel color value of the edge pixel is from the beginning of the first block of numbers;

replacing the color value in the second block of numbers with the second modified value if the color value is equal to the maximum color value of the original channel color values in the edge pixel or replacing it with the third modified color value if the color value is less than the maximum color value of the original channel color values in the edge pixel; and saving the second block of numbers to permanent memory as a second digital image when the replacements are complete for each channel of each pixel.

2. The method of claim 1, wherein each of the at least three color channels for each pixel represent values of red, green or blue and a number of bits per channel for each pixel is greater than or equal to 8.

3. The method of claim 1, wherein the pixels of the digital image are positioned in the digital image such that their horizontal position in the digital image falls between the lowest value and the maximum value; and each lowest horizontal position value and each maximum horizontal position value is a function of the vertical position of the pixel in a bit map.

4. The method of claim 1, wherein the color values of each channel of each pixel of the digital image fall between a predetermined minimum value and a predetermined maximum value.

5. The method of claim 1, wherein for each pixel a ratio of a first color channel value to a second color channel is calculated and a ratio of the first color channel value to a third color channel value is calculated and so on up to the $k^{th}$ color channel value in the k color channel system and a ratio of the second color channel value to the third color channel value is calculated and so on up to the $k^{th}$ color channel value in the k color channel system and for each such ratio a predetermined maximum value and a predetermined minimum value is input or calculated and a pixel is analyzed if, for each ratio calculated from each of the color channel values of that pixel, the ratio value falls between the corresponding predetermined minimum and maximum values for that color channel.

6. The method of claim 1, wherein for each edge pixel if the sum of channel specific differences is greater than or equal to a predetermined value then the edge pixel is deemed a strong edge and the modified color value of the channel in the edge pixel is multiplied by a predetermined value distinct from the predetermined value used to multiply the modified color value in pixels not deemed a strong edge.

* * * * *